United States Patent
Jain et al.

(10) Patent No.: US 6,519,168 B2
(45) Date of Patent: Feb. 11, 2003

(54) HIGH FREQUENCY DC TO AC INVERTER

(75) Inventors: Praveen Kumar Jain, Kanata (CA); Haibo Zhang, Kanata (CA)

(73) Assignee: ChipPower.com, Inc., Nepean (CA)

( * ) Notice: Subject to any disclaimer, the term of this patent is extended or adjusted under 35 U.S.C. 154(b) by 0 days.

(21) Appl. No.: 09/910,074

(22) Filed: Jul. 23, 2001

(65) Prior Publication Data

US 2002/0008981 A1 Jan. 24, 2002

Related U.S. Application Data

(60) Provisional application No. 60/220,165, filed on Jul. 24, 2000.

(51) Int. Cl.$^7$ ................................................ H02M 3/24
(52) U.S. Cl. ...................... 363/98; 363/132; 327/423; 327/588
(58) Field of Search .................... 363/17, 98, 132; 327/423, 588

(56) References Cited

U.S. PATENT DOCUMENTS 5,157,593 A * 10/1992 Jain ........................... 363/132
6,310,912 B1 * 10/2001 Maiocchi et al. ............ 375/238
6,341,078 B1 * 1/2002 Miller ......................... 363/132

OTHER PUBLICATIONS

Article "PC Platform Power Distribution System: Past Application, Today's Challenge and Future Direction", J. Drobnik, et al., International Telecommunications Energy Conference, 1999. No Month.

Article "A 20 KHz Hybrid Resonant Power Source for the Space Station", P. Jain et al., IEEE Transactions on Aerospace and Electronic Systems, vol. 25, No. 4, Jul. 1989.

* cited by examiner

Primary Examiner—Michael Sherry
Assistant Examiner—Gary L. Laxton
(74) Attorney, Agent, or Firm—Max R. Wood; Ogilvy Renault

(57) ABSTRACT

A high-frequency resonant sine wave DC to AC inverter suitable for use in a personal computer (PC) power supply includes a full-bridge inverter, a resonant circuit, a phase shift modulation circuit, and a resonant gate driver. The resonant gate driver provides sinusoidal gate drive signals to the full-bridge inverter enabling highly efficient operation on the inverter.

15 Claims, 20 Drawing Sheets

Block diagram of a phase-shift modulated resonant DC/AC high frequency inverter with resonant gate drives

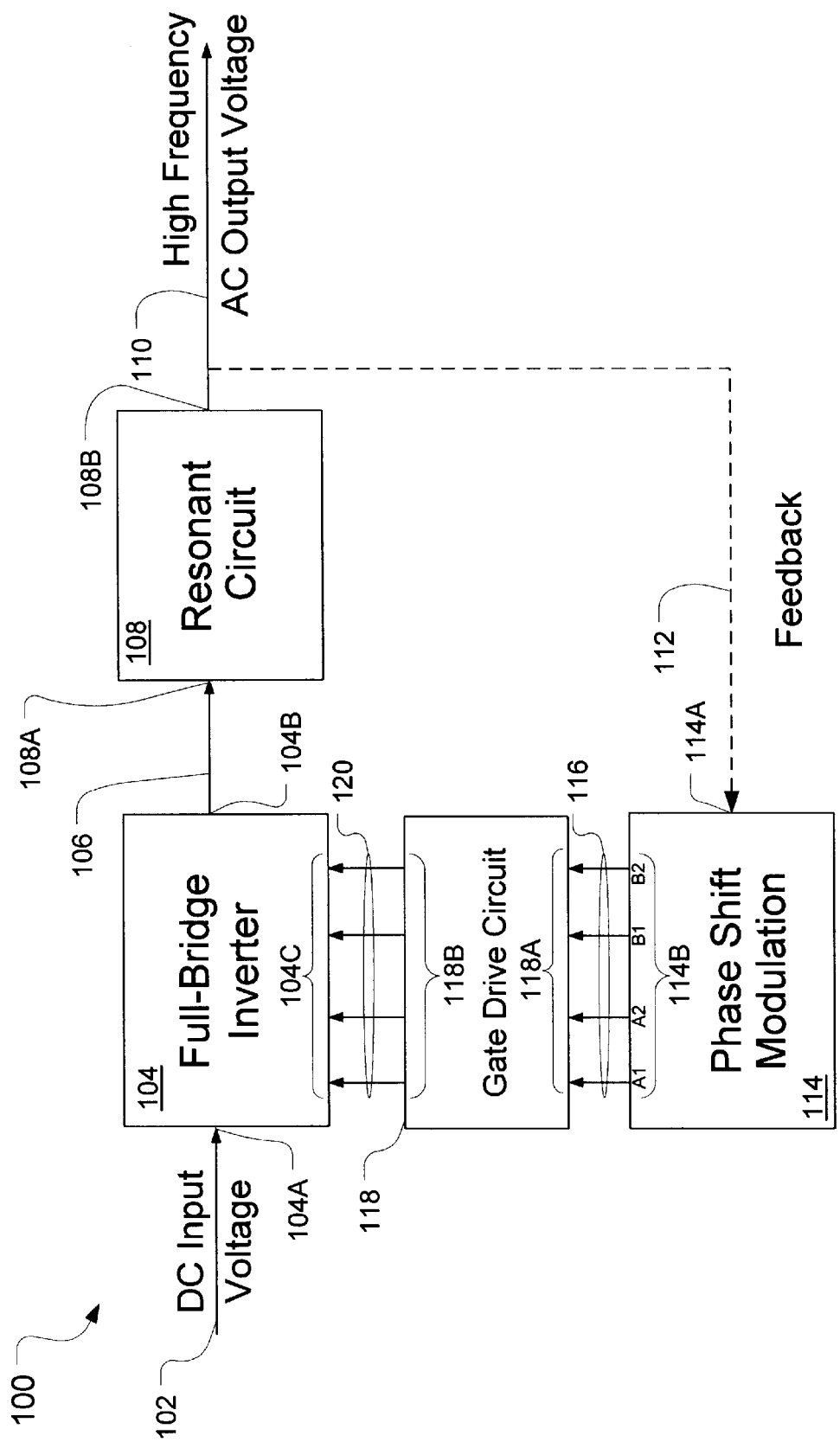
FIG. 1: Block diagram of a DC to high frequency AC inverter (Prior Art)

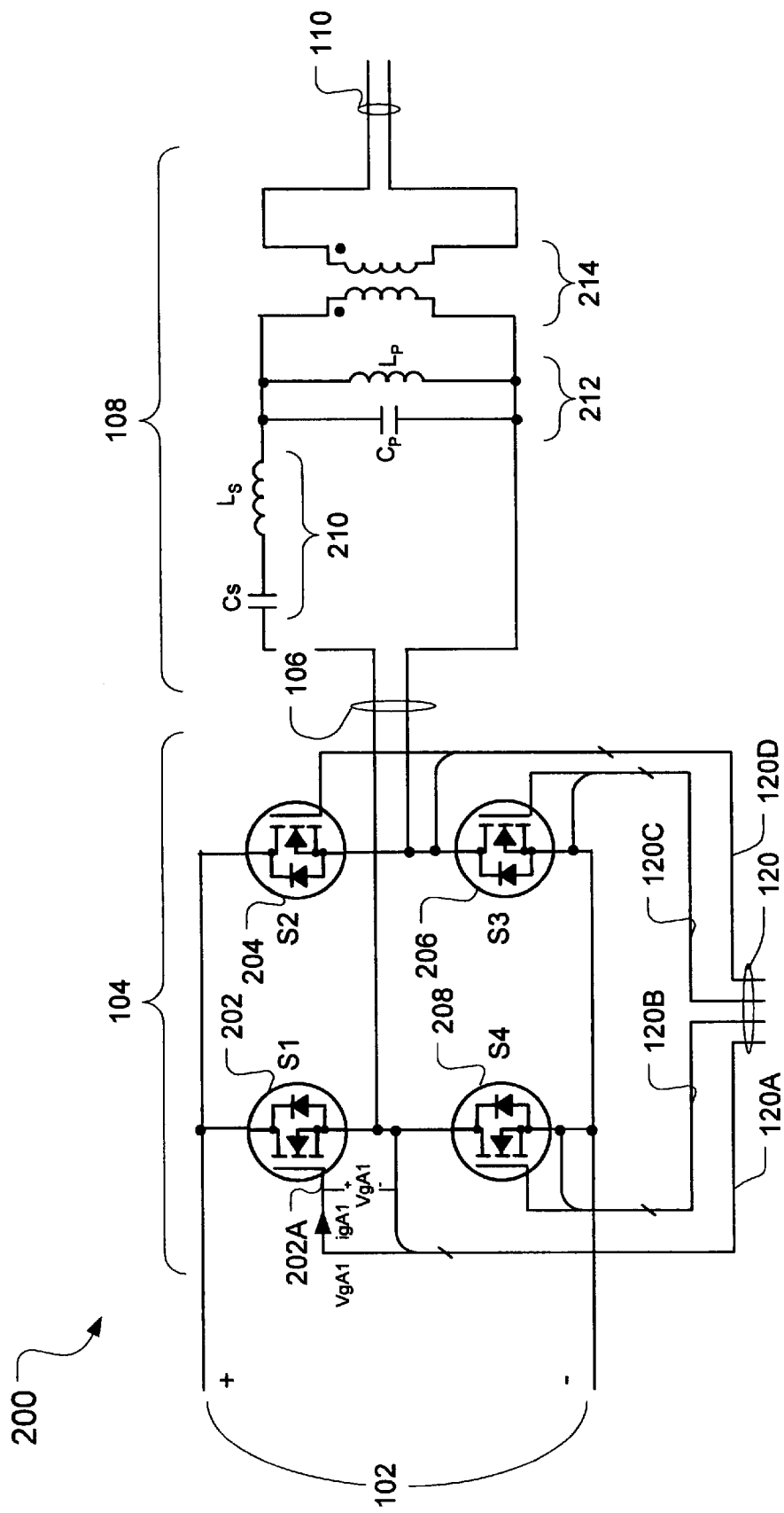
FIG. 2A: Circuit Diagram of full-bridge inverter and resonant circuit (Prior Art)

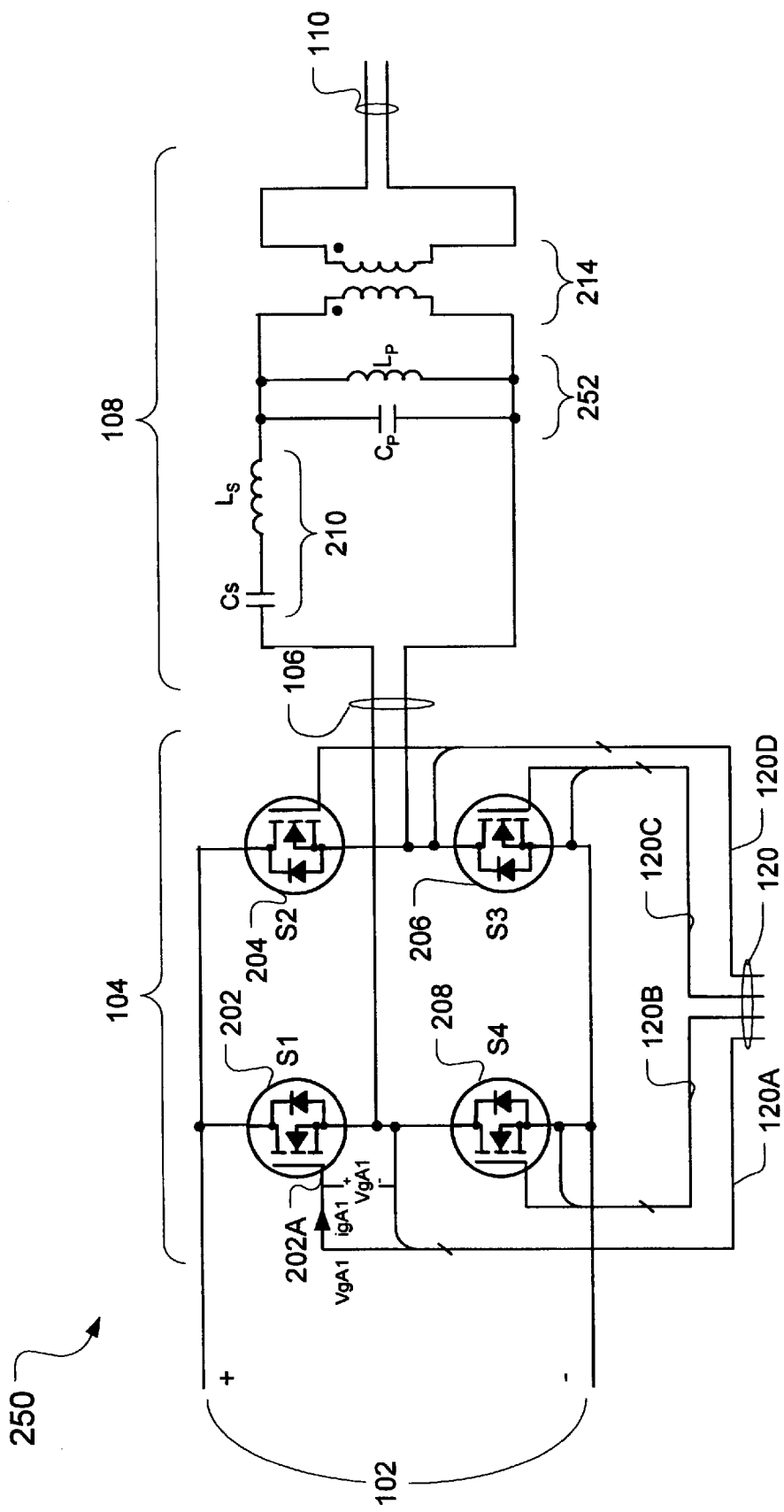
FIG. 2B: Circuit Diagram of full-bridge inverter and resonant circuit (Prior Art)

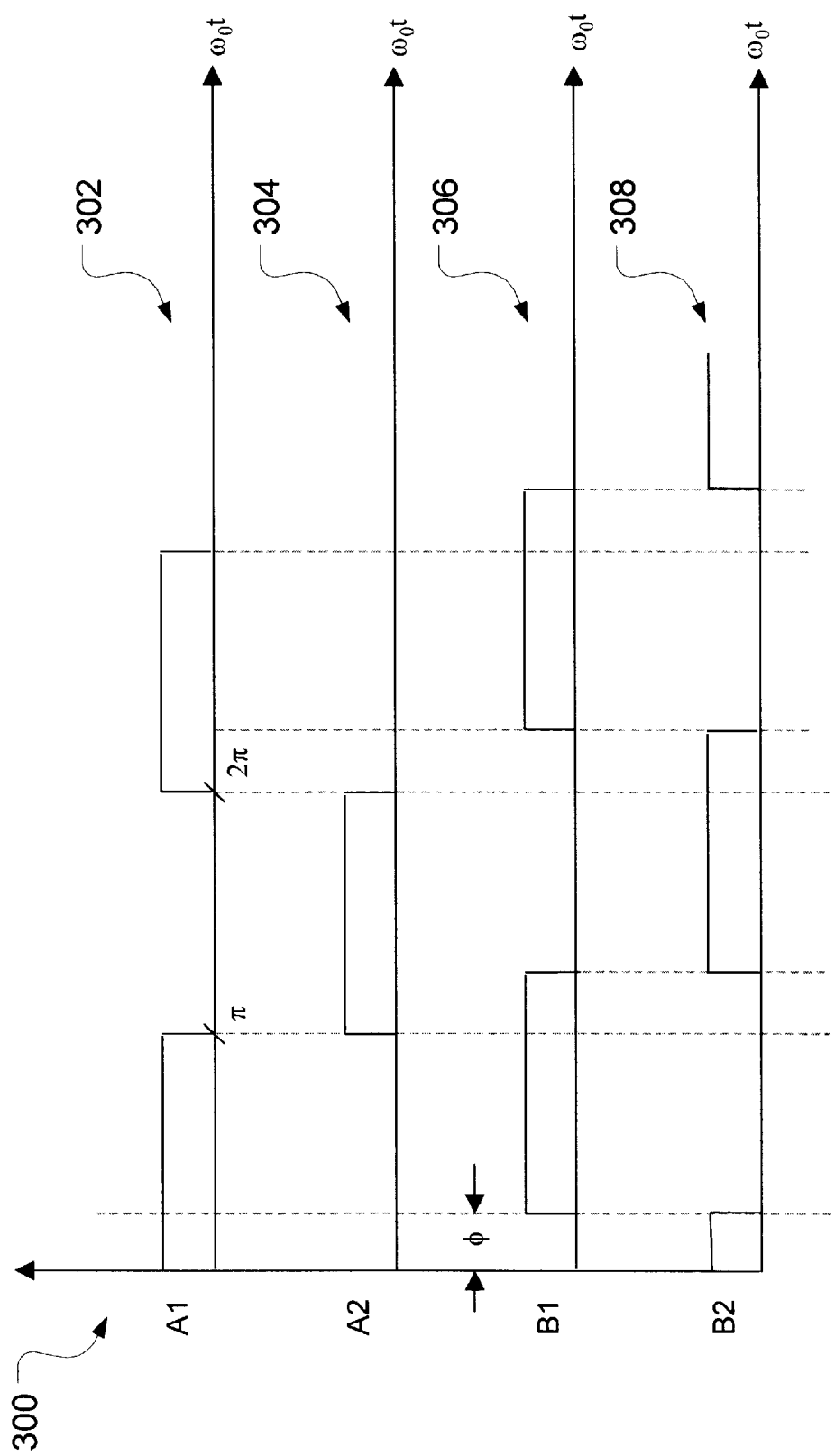
FIG. 3: Gating signals of a phase-shift modulated DC to AC inverter (Prior Art)

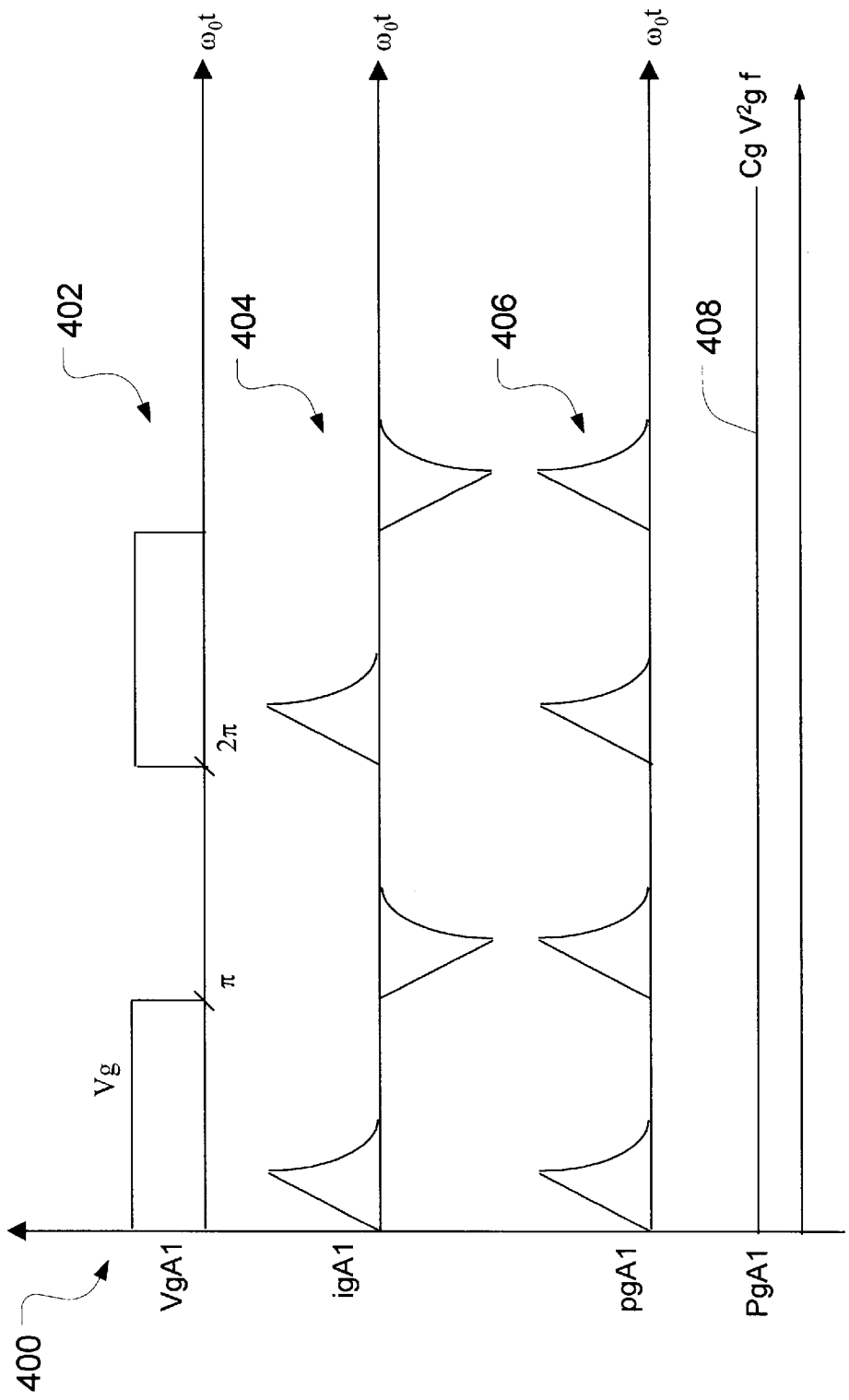
FIG. 4: Gate voltage (VgA1), current (igA1), gate instantaneous power (pgA1) and gate average power (PgA1) of gate of switch A1 (Prior Art)

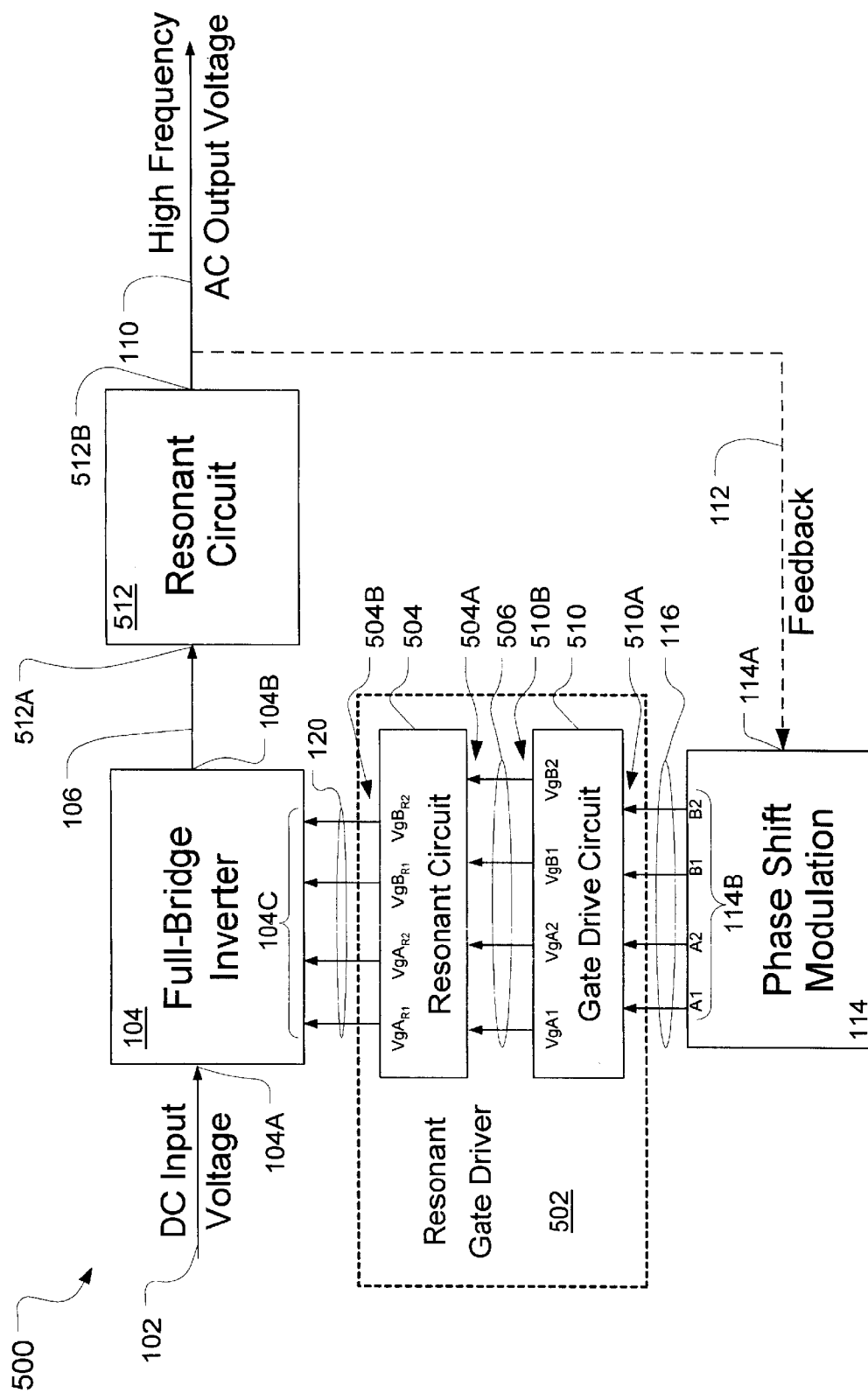
FIG. 5: Block diagram of a phase-shift modulated resonant DC/AC high frequency inverter with resonant gate drives

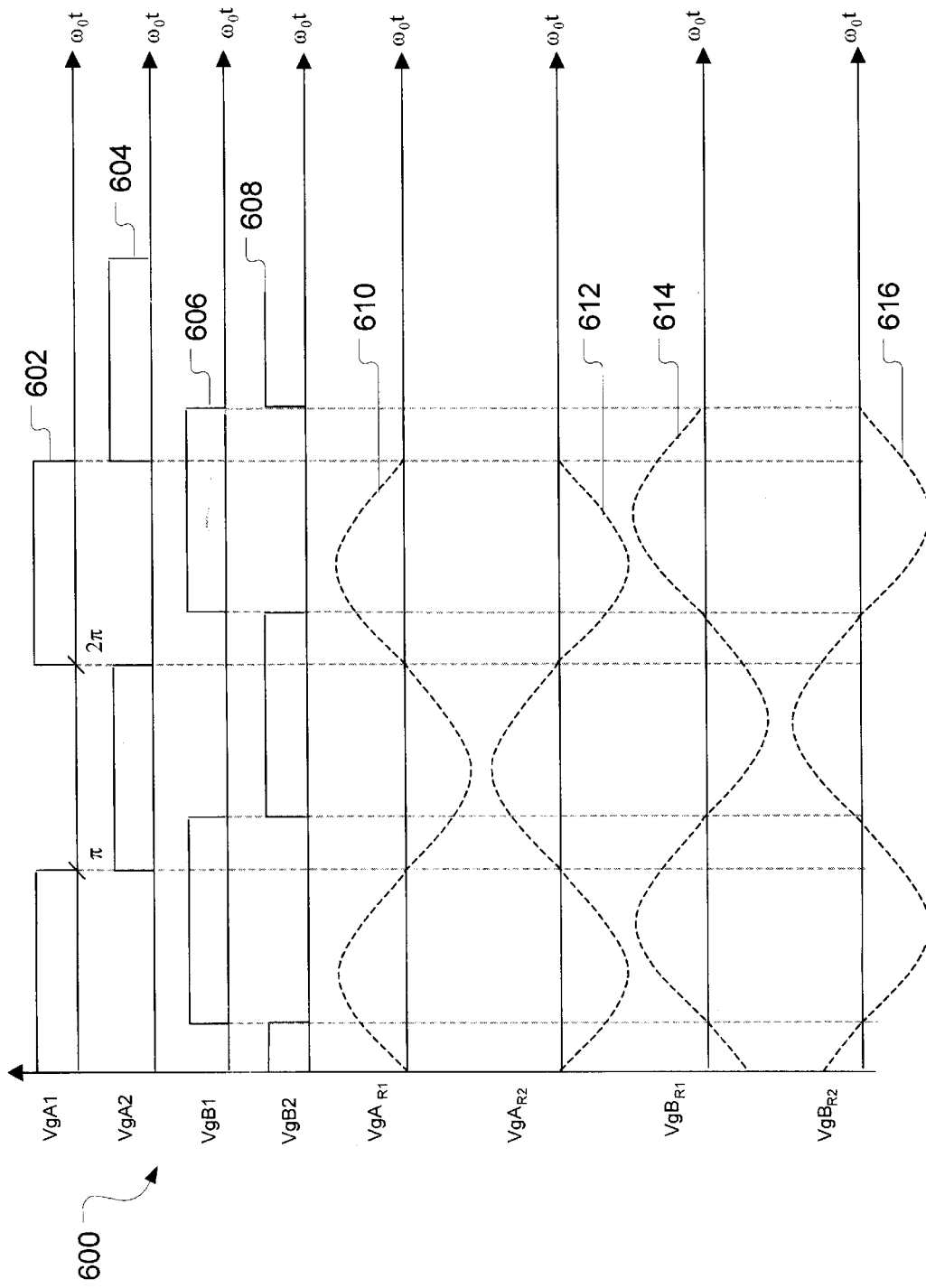
FIG. 6: Gating signals used in the AC to DC inverter of FIG. 5

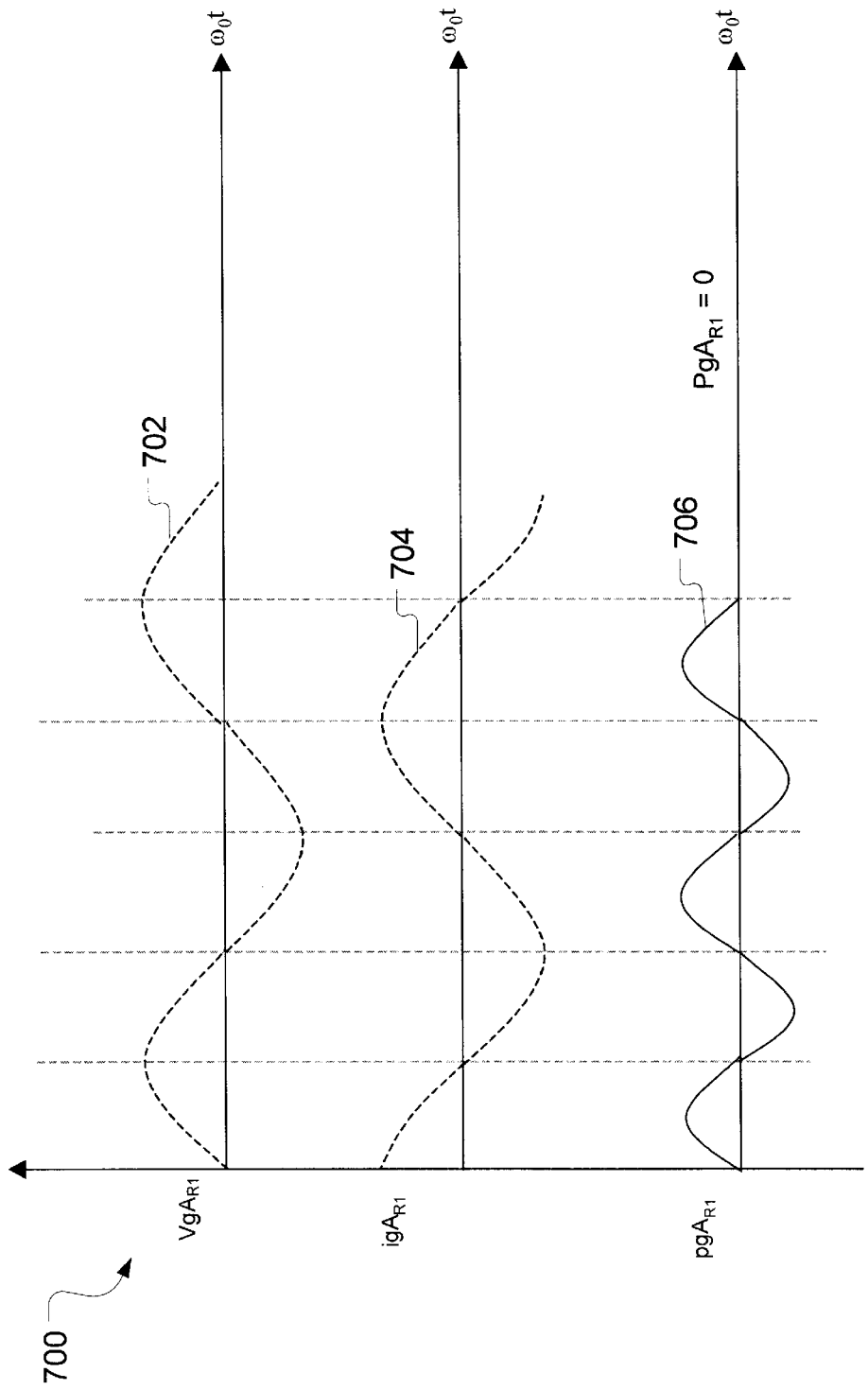
FIG. 7: Gate voltage, current, instantaneous power and average power of resonant gate drive A1

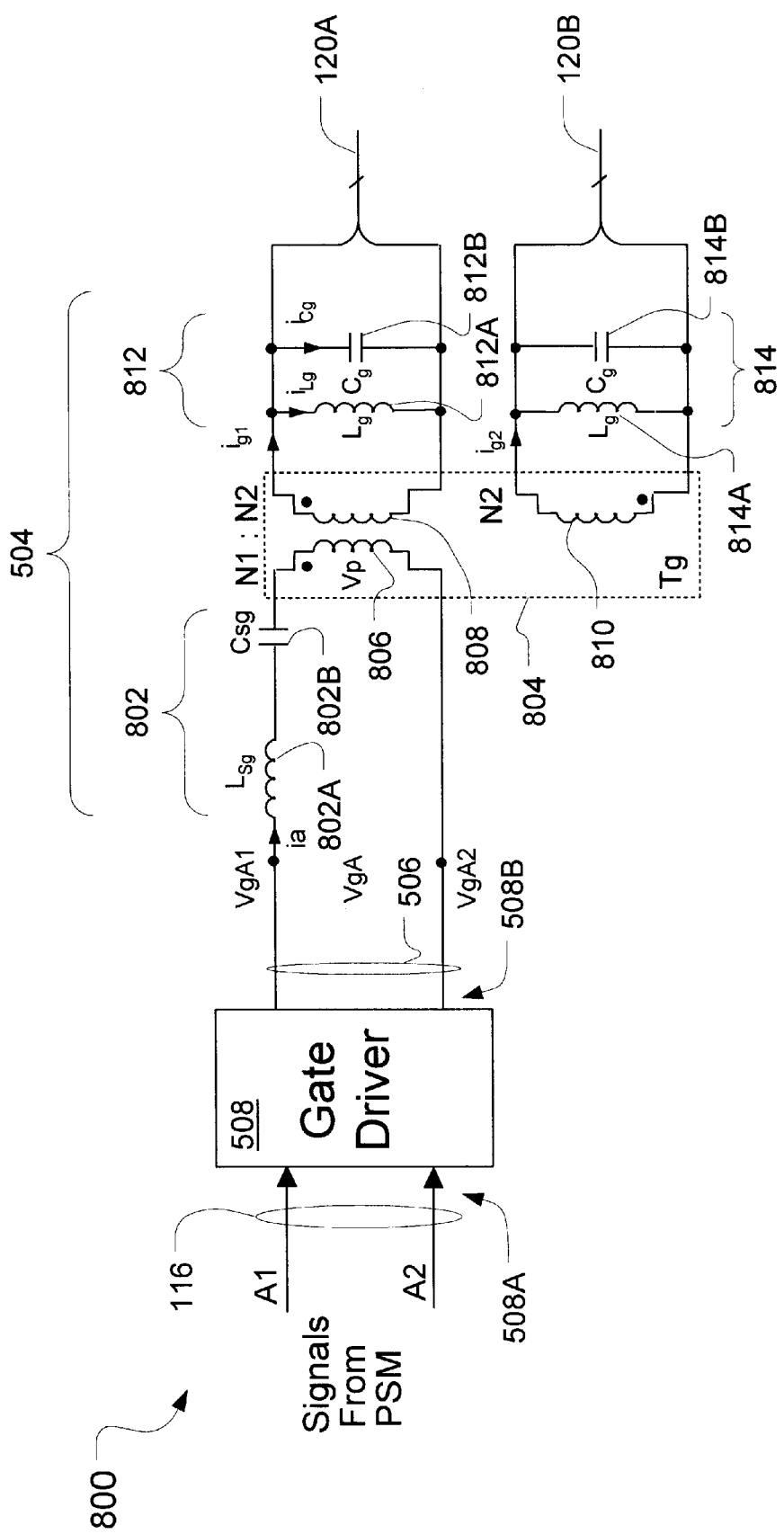
FIG. 8: Resonant gate drive circuit

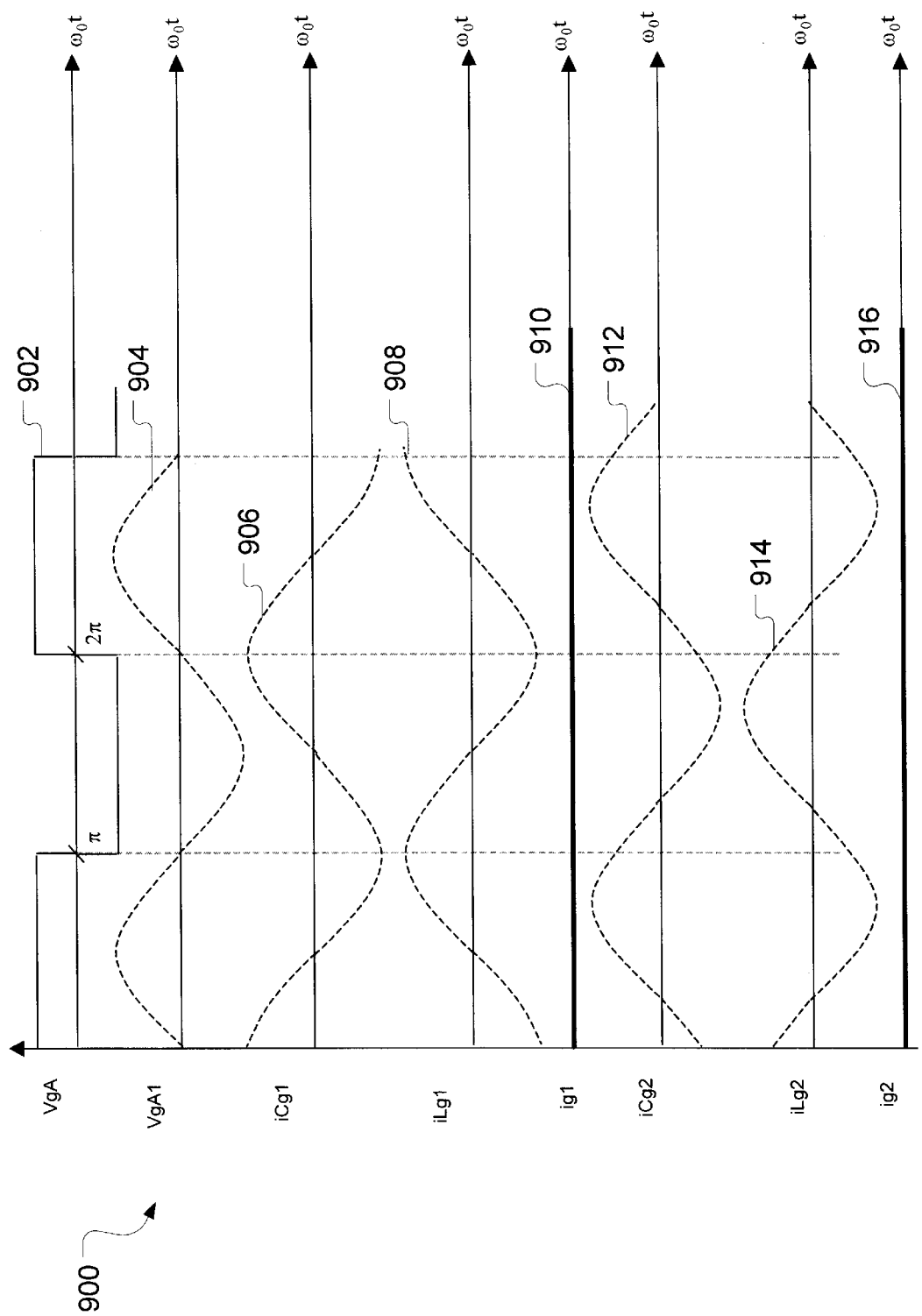
FIG. 9: Voltage and current waveforms of the resonant gate drive of FIG. 8

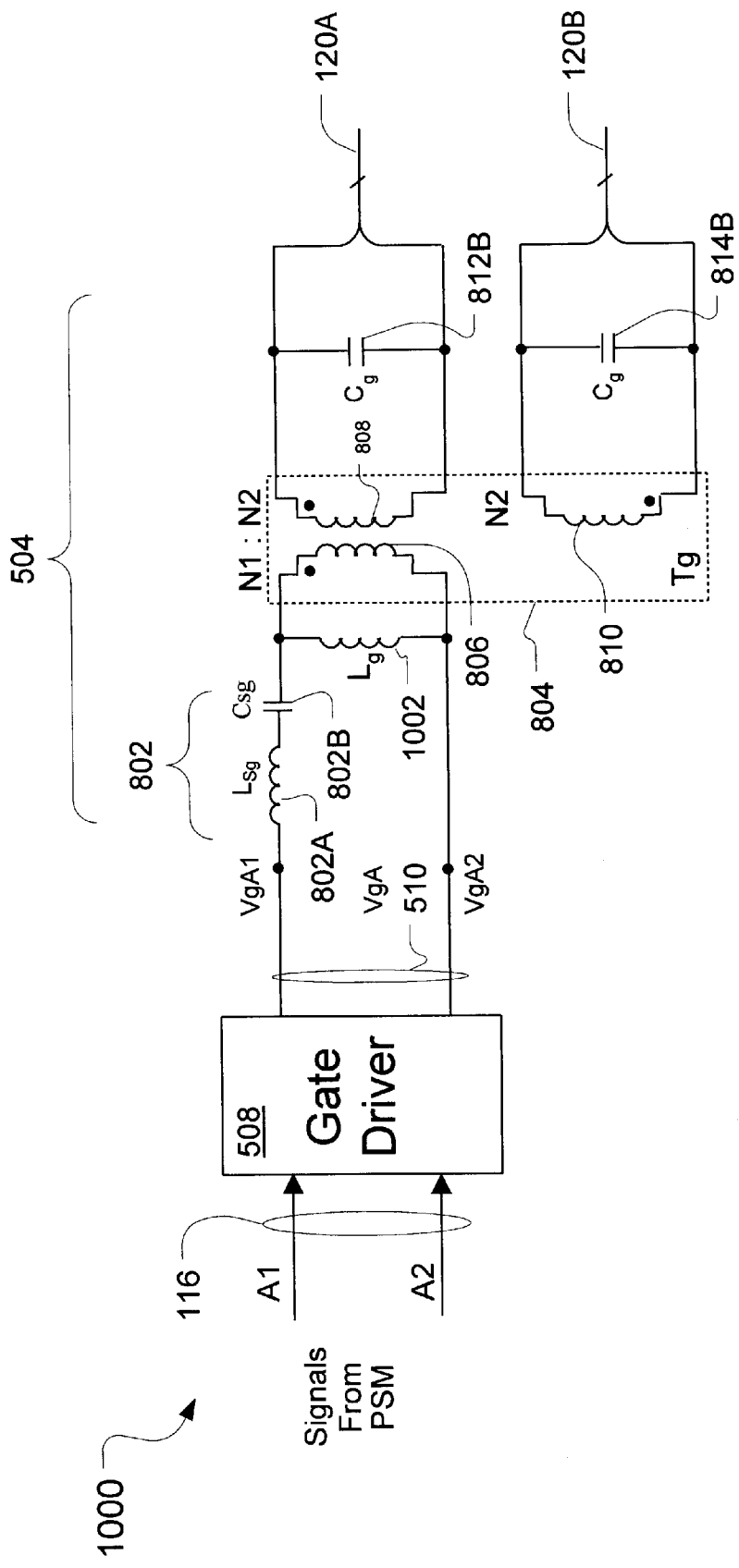
FIG. 10: Resonant gate drive with a common parallel inductor at the primary side

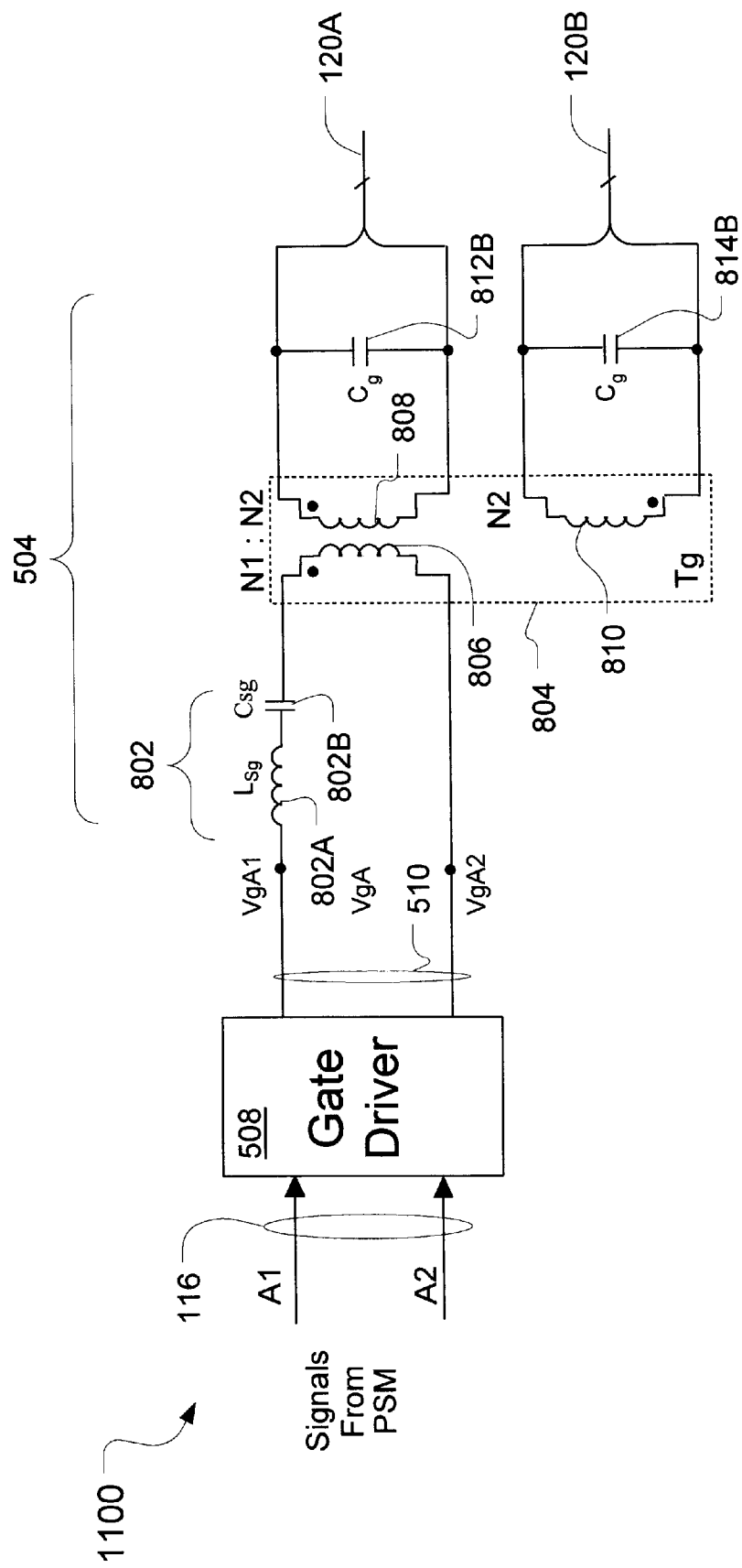
FIG. 11: Resonant gate drive with integrated inductor Lg with the transformer

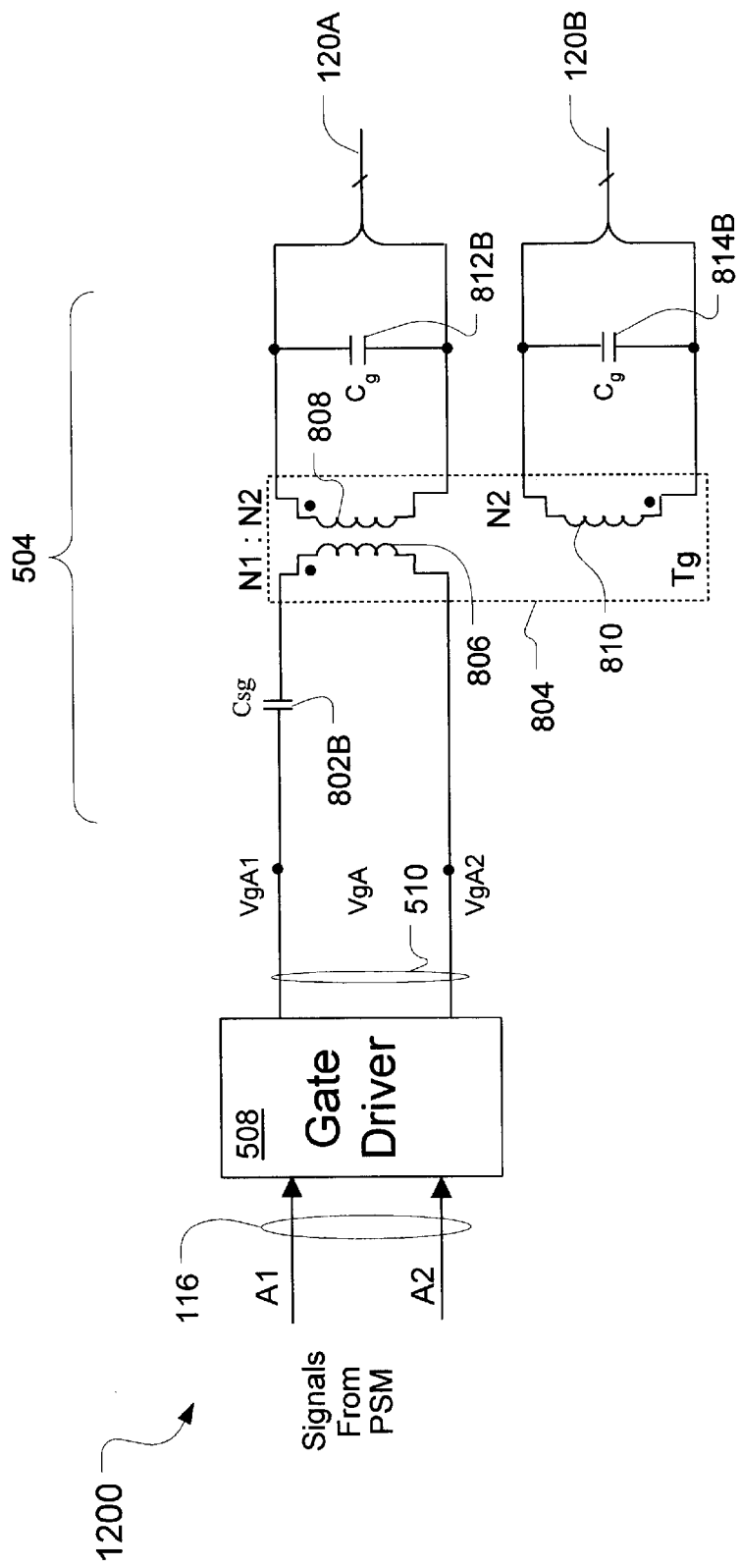
FIG. 12: Resonant gate drive with integrated resonant inductor with the transformer

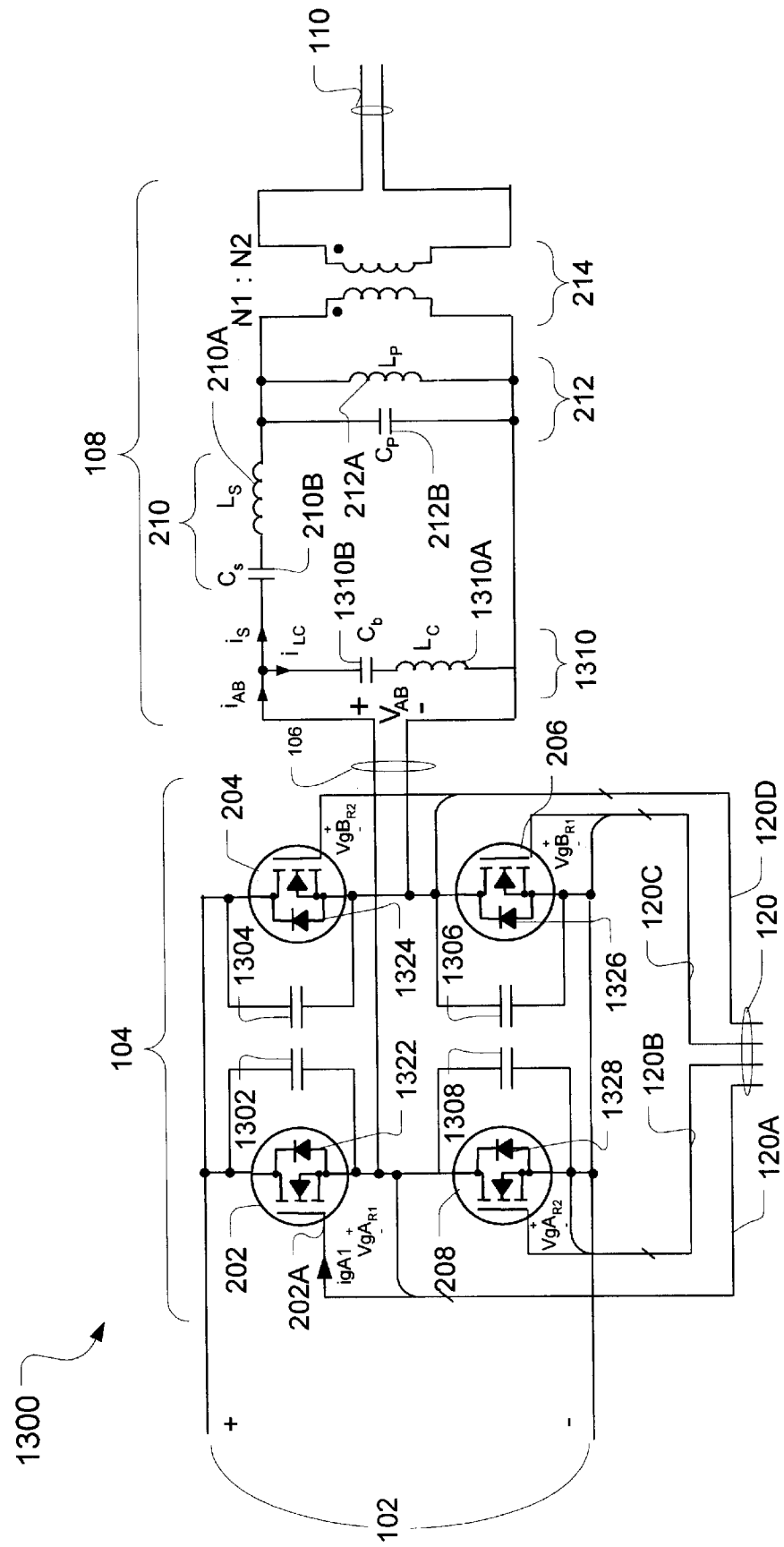
FIG. 13A: Full-bridge inverter and resonant circuit

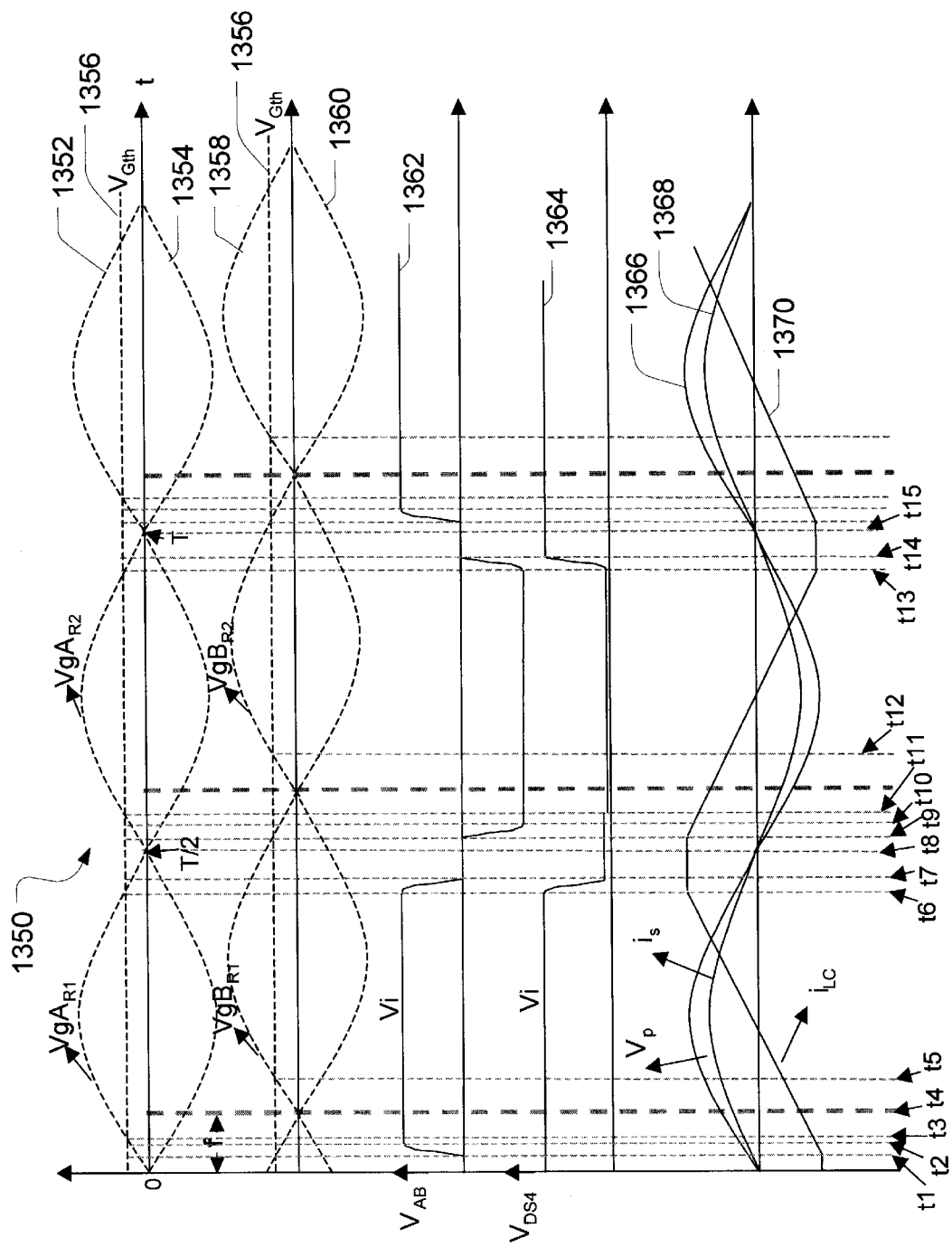
FIG. 13B: Operating waveforms of the full-bridge inverter and resont circuit of FIG. 13A.

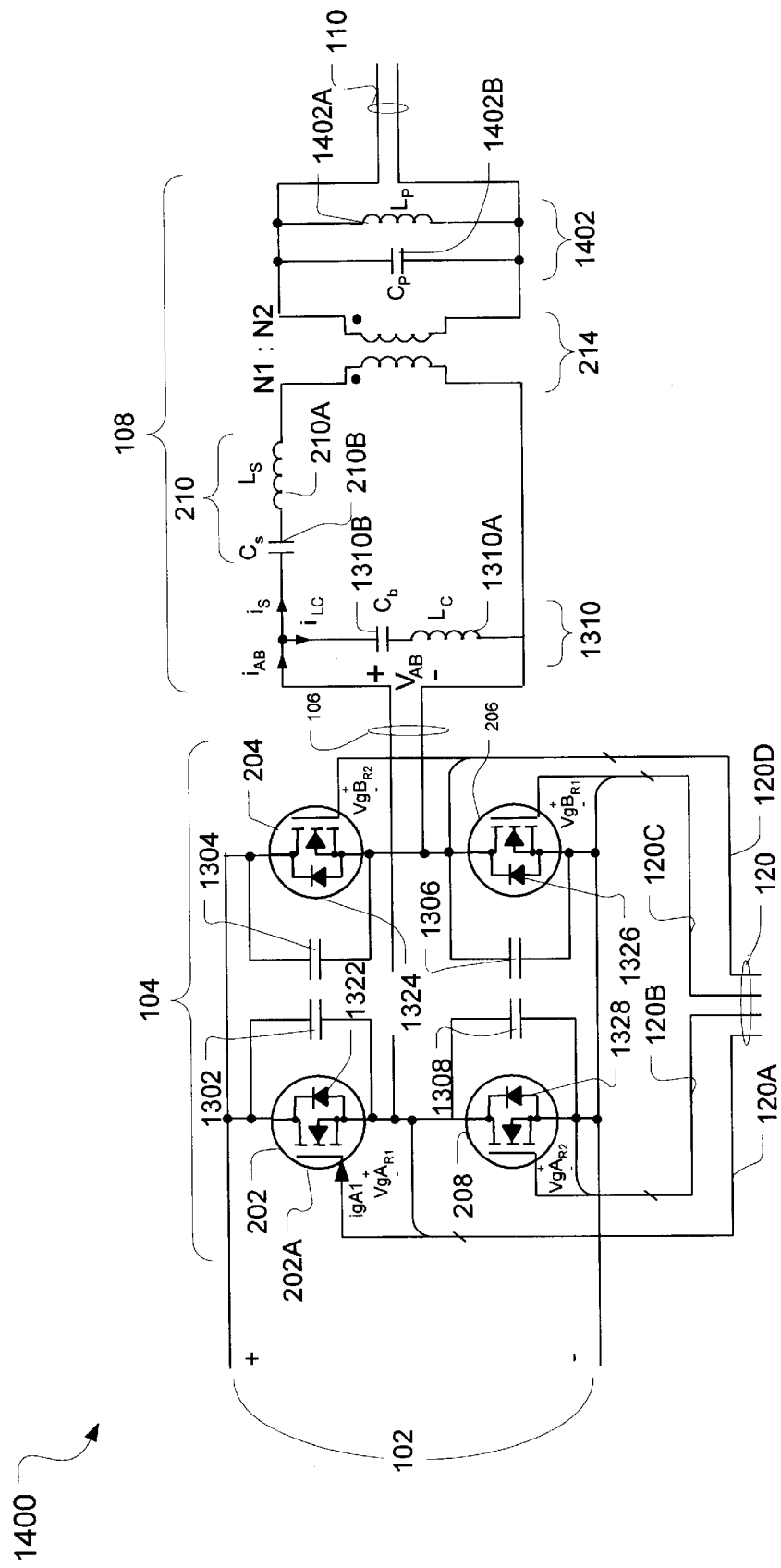
FIG. 14: Full-bridge inverter and resonant circuit with parallel circuit at the secondary side

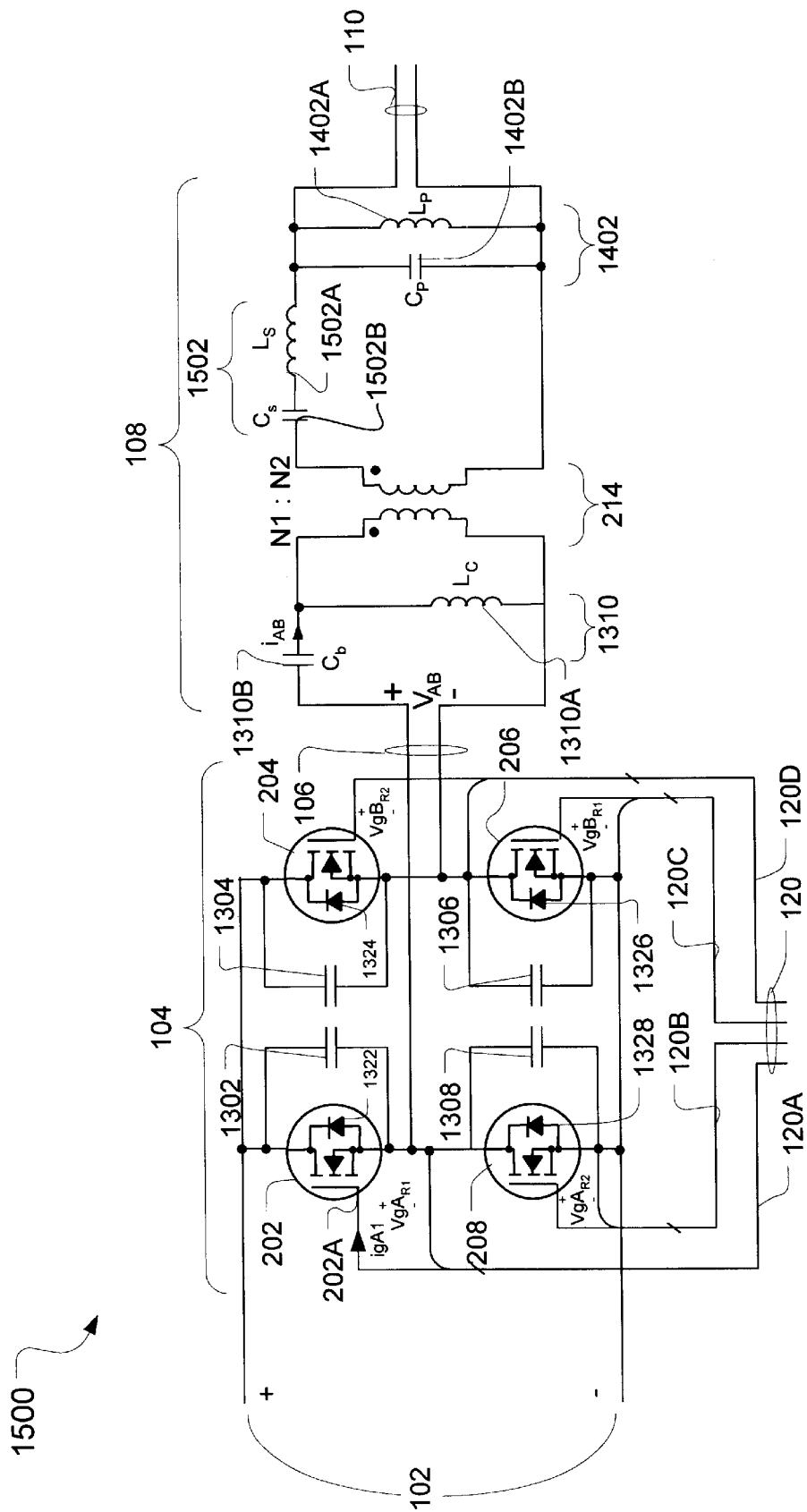
FIG. 15: Full-bridge inverter and resonant circuit both the resonant circuits on the secondary side

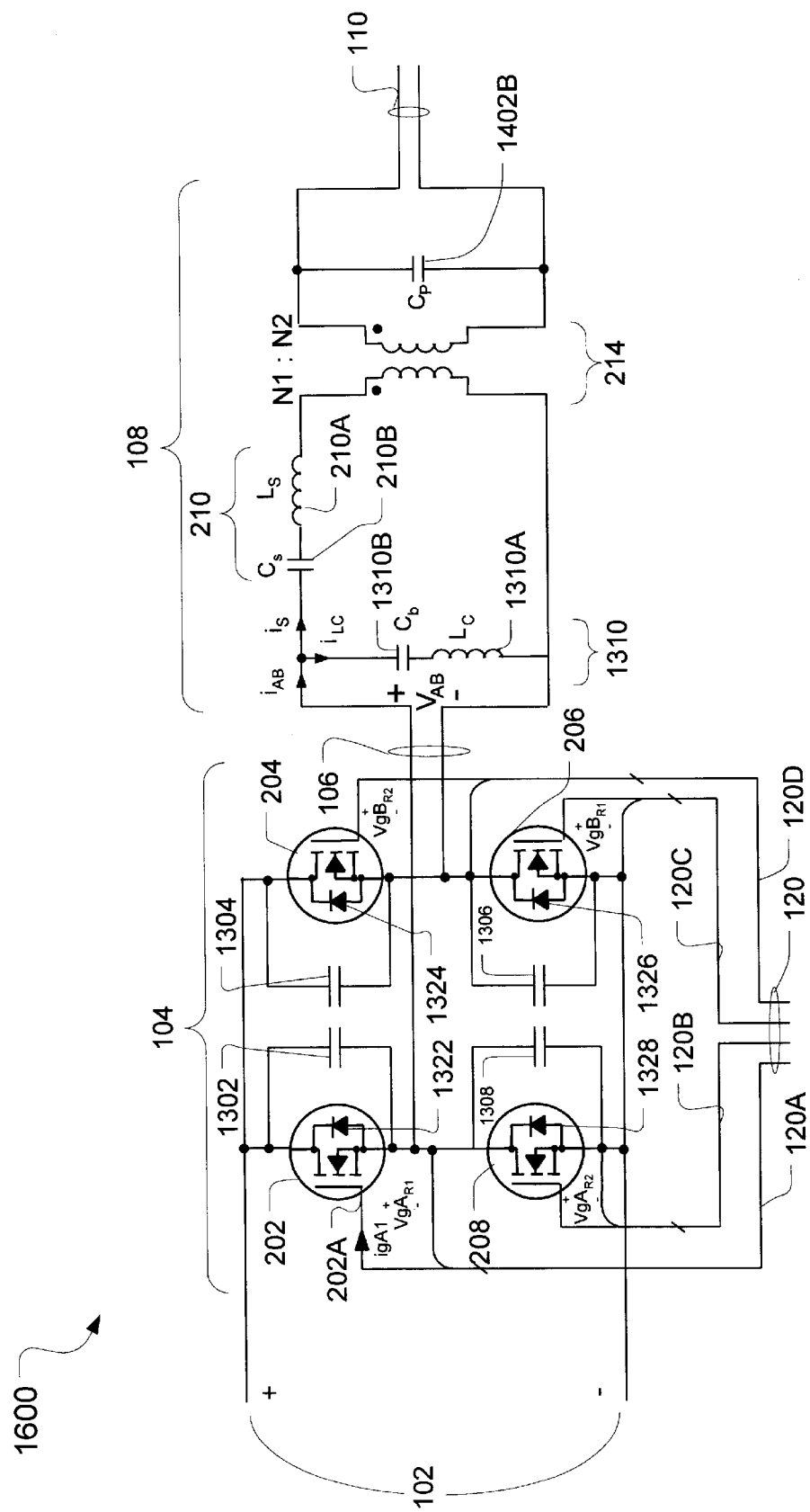
FIG. 16: Full-bridge inverter and resonant circuit with integrated parallel inductor

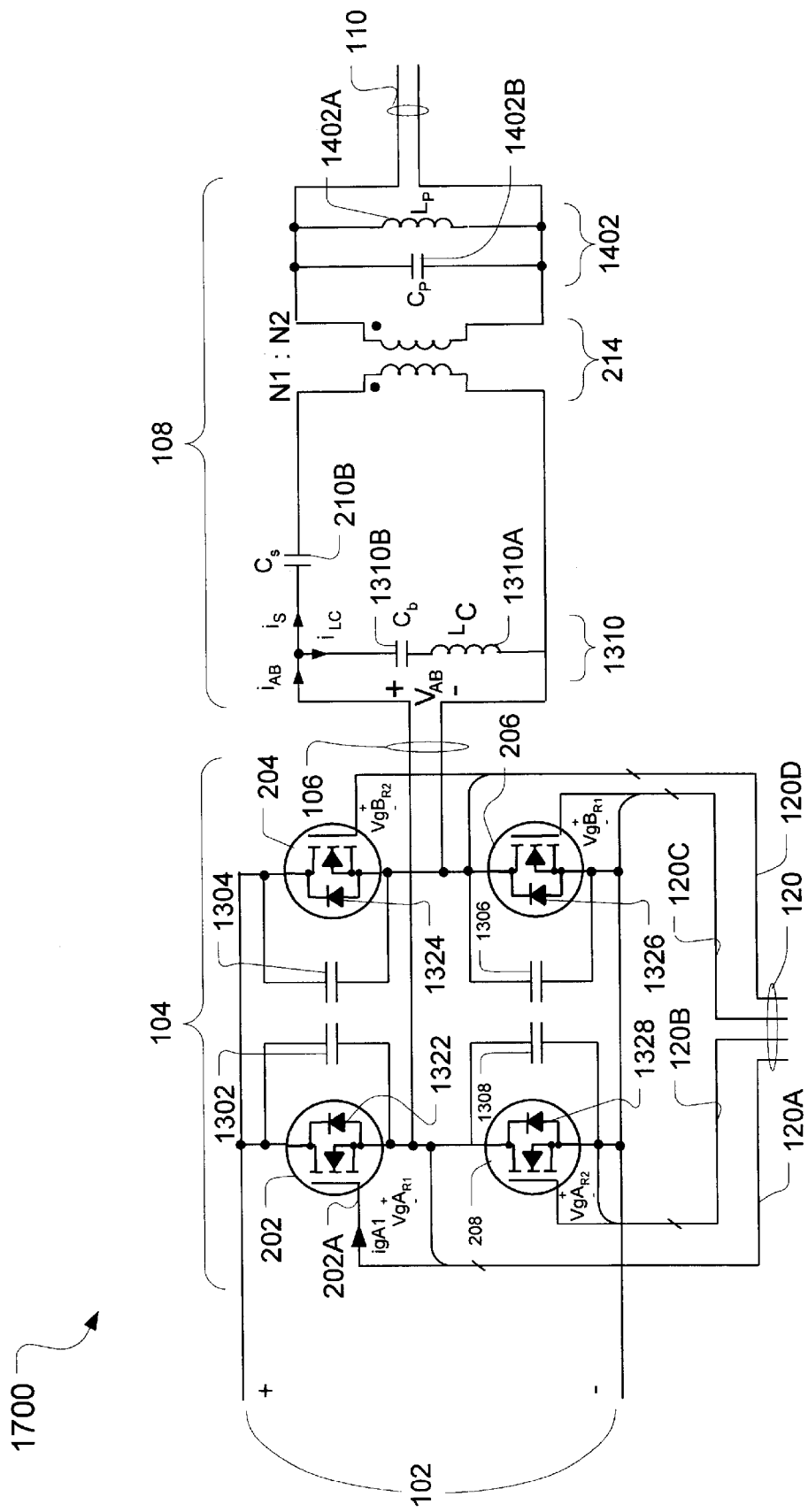
FIG. 17: Full-bridge inverter and resonant circuit with integrated series inductor

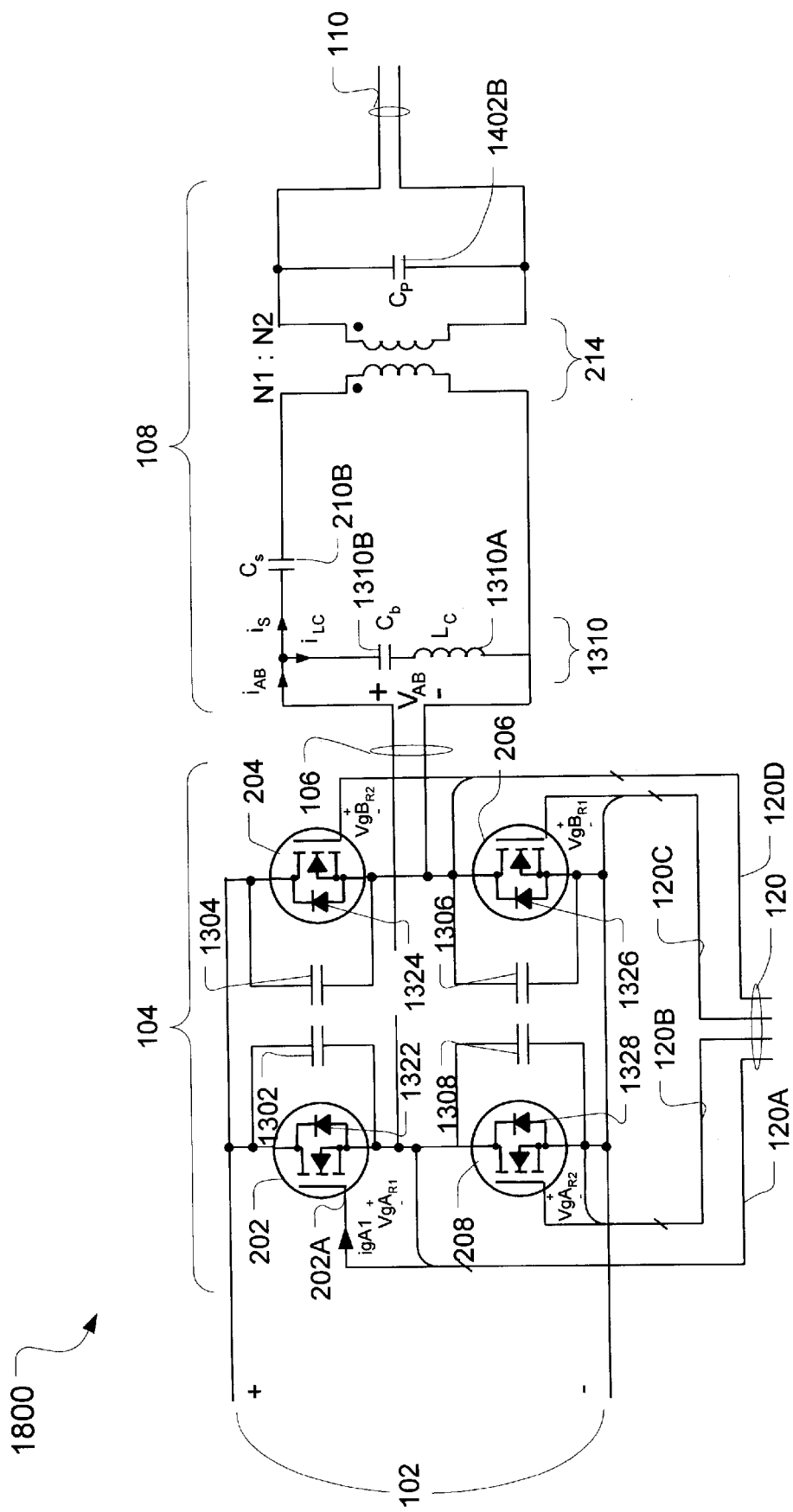
FIG. 18: Full-bridge inverter and resonant circuit with integrated series and parallel inductors

HIGH FREQUENCY DC TO AC INVERTER

TECHNICAL FIELD

This invention relates to power supplies for electronic equipment and, in particular, to inverters for generating high frequency sinusoidal AC voltages for electronics equipment used in telecommunications and computer systems. Typical examples of potential use are in personal computers, servers, routers, network processors, and opto-electronic equipment.

BACKGROUND OF THE INVENTION

Segments of the personal computer (PC) industry have dramatically changed during the last decade. The future is even more challenging. A dramatic increase in the processor speeds of PCs has required an overwhelming increase in current and associated dynamics (very high slew rate). This already challenging technical requirement is further complicated by a need for voltage reduction, potentially to sub-volt levels.

In the past, there was virtually no challenge in powering computers. A multiple output, very slow power supply called a "Silver Box (SB)" was adapted to meet the requirements of every power demand. However, as silicon development progressed, multiple voltages of less than 3.3V were required. Voltage Regulator Modules (VRMs) on the processor Mother Board (MB) were a logical solution to that problem. Today, the number of VRMs required on the Mother Board is increasing. In addition to the VRMs, a large number of de-coupling capacitors are required in proximity of the processor to meet the requirements of very high slew rate of the current. This has resulted in a rapid increase in the cost, as well as a large reduction in overall efficiency, of the power delivery system.

A number of options for improving this situation have been explored. For example, Advanced Voltage Regulator Module (AVRM) offers the capability to supply high di/dt and high current, however, at increased cost, and with low efficiency and moderately high capacity of the de-coupling capacitors. Replacing low voltage DC distribution with higher DC voltage, such as 48V, is more promising but has a drawback of higher cost. Recently a novel High Frequency Alternating Current (HFAC) power delivery architecture has been proposed for powering the future generation PCs in reference entitled, "PC Platform Power Distribution System: Past Application, Today's Challenge and Future Direction" published in the conference proceedings of International Telecommunications Energy Conference, Copenhagen, Denmark, June 1999 by J. Drobnik, L. Huang, P. Jain and R. Steigerwald. In the HFAC architecture, the system power supply (silver box) generates high frequency and high voltage. The HFAC is then fed to an individual AC-DC converter (ACVRM) and converted into DC of specific parameters at the point of use.

HFAC is conceptually the simplest architecture proposed to date, which deals with all of the power delivery issues defined above. This includes elimination of duplicated power conversions, and active energy steering without additional components.

The key to successful implementation of an HFAC power delivery system resides in the two stages of power conversion namely; DC to AC high frequency conversion stage and the stage that converts high frequency AC to DC.

FIG. 1 shows a block diagram of a conventional DC to high frequency AC inverter 100. The inverter 100 includes a full-bridge inverter 104 having an input 104A for receiving a DC input voltage 102 and providing an output 104B. The output 104B is connected at 106 to an input 108A of a resonant circuit 108. An output 108B of the resonant circuit 108 provides a high frequency AC output voltage 110. The AC output voltage 110 is fed back 112 to an input 114A of a phase-shift modulation circuit 114. The modulation circuit provides four outputs 114B connected at 116 to four inputs 118A of a gate drive circuit 118. The gate drive circuit 118 has four outputs 118B connected at 120 to four inputs 104C of the inverter 104.

A number of power circuit configurations to implement the full-bridge inverter and resonant circuit of FIG. 1 are possible but the circuits as shown in FIGS. 2A and B are the circuits most commonly used in these implementations.

FIG. 2A shows the full-bridge inverter 104 and the resonant circuit 108 sections of a conventional inverter 200 which was described in 'A 20 kHz Hybrid Resonant Power Source for the Space Station', *IEEE Trans. on Aerospace and Electronics Systems,* vol. 25, No. Jul. 4, 1989, 491–496 by P. Jain & M. Tanju. The full-bridge inverter 104 includes a first switch 202, a second switch 204, a third switch 206, and a fourth switch 208. Each switch 202,204,206,208 is preferably an N-channel field-effect transistor (FET). The resonant circuit 108 includes a series resonant circuit 210, a parallel resonant circuit 212, and a transformer 214.

The full-bridge inverter 104 produces a quasi-square voltage at its output 106, which is controlled using a phase-shift modulation circuit 114 (FIG. 1) commonly used in such applications. Both the series 210 and parallel 212 resonant circuits are tuned to an operating frequency of the inverter. Although the resonant circuit 108 produces a regulated sinusoidal voltage at its output 110, this inverter 200 does not provide zero-voltage switching conditions for at least two of the four switches 202,204,206,208, which results in higher switching losses at higher operating frequencies. Therefore, the operation of this circuit is limited to lower operating frequencies.

FIG. 2B shows the full-bridge inverter 104 and the resonant circuit 108 sections of a conventional inverter 250 which was described in 'Constant frequency resonant DC/DC converter', U.S. Pat. No. 5,157,593, Oct. 20, 1992 by P. Jain. The full-bridge inverter 104 is identical to the one shown in FIG. 2A. The resonant circuit 108 includes a series resonant circuit 210, a parallel resonant circuit 252, and a transformer 214.

The full-bridge circuit 104 produces a quasi-square voltage at its output 106, which is controlled using a phase-shift modulation circuit 114 (FIG. 1) commonly used in such applications. In this configuration, the series resonant circuit 210 is tuned to an operating frequency of the inverter 250 while the parallel circuit 252 is tuned at a frequency, which is lower than the operating frequency. Although the resonant circuit 108 produces a regulated sinusoidal voltage at its output 110 and provides zerovoltage switching conditions for all the four switches 202,204,206,208, the de-tuning of the parallel branch 252 requires the series resonant components 210 and the output transformer 214 to have higher maximum ratings and hence be more expensive.

Another fundamental problem that limits the operation of the inverter circuits of FIGS. 2A and B at higher operating frequencies is gate circuit losses of the FETs 202,204,206, 208 used in the full-bridge circuit 104. FIG. 3 shows a graph 300 of typical gating signals A1 302, A2 304, B1 306, and B2 308 produced by the phase-shift circuit 114. FIG. 4 shows a graph 400 of gate voltage (VgA1) 402, gate current (igA1) 404, instantaneous gate power (pgA1) 406, and average gate power (PgA1) 408 for a gate 202A of the first FET switch 202. This graph 400 clearly shows that when a rectangular voltage pulse 402 is applied to the gate 202A of the FET 202, which has a capacitance, a pulsating current 404 is drawn from this voltage. This causes the power loss 406 in the gate circuit, which is approximately given by $Cg*Vg^2*f$ 408 (where Cg is gate capacitance; Vg is gate voltage; and, f is the operating frequency). At higher frequency, the gate losses are prohibitively high, which limits the operation of inverter circuits of FIGS. 2A and B at very high frequency.

It is clear from the above discussion that the conventional approaches to converting DC to high frequency AC have low conversion efficiency due to high switching losses.

There therefore exists a need for an inverter topology, which is capable of operating at substantially higher frequencies and has no, or very small, switching losses, including gate circuit losses.

SUMMARY OF THE INVENTION

It is therefore an object of the invention to provide a DC/AC inverter, which forms a high frequency sinusoidal AC source.

The invention therefore provides a high-frequency resonant sine wave DC to AC inverter suitable for use in a personal computer (PC) power supply, which includes a full-bridge inverter, a resonant circuit, a phase shift modulation circuit, and a resonant gate driver. The resonant gate driver provides sinusoidal gate drive signals to the full-bridge inverter enabling highly efficient operation on the inverter.

The invention further provides a method of driving an inverter to convert direct current (DC) to alternating current (AC), comprising a step of receiving square wave gating signals at a resonant gate driver and modifying the square wave gating signals to form sinusoidal gating signals for driving the inverter.

BRIEF DESCRIPTION OF THE DRAWINGS

Further features and advantages of the present invention will become apparent from the following detailed description, taken in combination with the appended drawings, in which:

FIG. 1 is a block diagram of a conventional AC to high frequency AC voltage inverter;

FIGS. 2A and 2B are circuit diagrams of conventional full-bridge inverter and resonant circuits;

FIG. 3 is a graph of gating signals of a conventional DC to AC inverter;

FIG. 4 is a graph of gate voltage, current, instantaneous power, and average power of a gate of the inverter of FIG. 2A;

FIG. 5 is a block diagram of an AC to DC inverter in accordance with the present invention;

FIG. 6 is a graph of gating signals used in the AC to DC inverter of FIG. 5;

FIG. 7 is a graph of gate voltage, current, instantaneous power and average power of the inverter of FIG. 5;

FIG. 8 is a schematic diagram of a resonant gate drive circuit of FIG. 5;

FIG. 9 is a graph of voltage and current waveforms of the resonant gate drive circuit of FIG. 8;

FIGS. 10 to 12 are schematic diagrams of alternative embodiments the resonant gate drive circuit of FIG. 8;

FIG. 13A is a schematic diagram of the full-bridge inverter and resonant circuit of FIG. 5;

FIG. 13B is a graph of operating waveforms of the full-bridge inverter and resonant circuit of FIG. 13A; and FIGS. 14 to 18 are schematic diagrams of alternative embodiments full-bridge inverter and resonant circuit of FIG. 5.

It will be noted that throughout the appended drawings, like features are identified by like reference numerals.

DETAILED DESCRIPTION OF THE PREFERRED EMBODIMENTS

A block diagram 500 of a preferred embodiment of the present invention is shown in FIG. 5. This block diagram 500 is identical the block diagram 100 shown in FIG. 1 except that the gate drive circuit 118 has been replaced by a resonant gate drive circuit 502, and the resonant circuit 108 has been replaced by an improved resonant circuit 512 which provides loss-less switching of all the FETs 202,204, 206,208 of the full-bridge inverter 104 without excessive rating of components in the resonant circuit 512. These two aspects of the present invention are described below.

Resonant Gate Driver

The resonant gate driver 502 as shown in FIG. 5 consists of a conventional gate drive circuit 510 and a resonant circuit 504. The gate drive circuit 510 has four inputs 510A that are connected 116 to the gating signals 114B (A1, A2, B1, B2) from the phase-shift modulation circuit 114. The gate drive circuit 510 generates rectangular voltage pulses 510B (VgA1 602, VgA2 604, VgB1 606, VgB2 608 in FIG. 6) that are connected 506 respectively to four inputs 504A of the resonant circuit 504. The resonant circuit 504 produces four sinusoidal voltage signals 504B (VgA$_{R1}$ 610, VgA$_{R2}$ 612, VgB$_{R1}$ 614, VgB$_{R2}$ 616 in FIG. 6) that are connected 120 respectively to the four inputs 104C of the full-bridge inverter circuit 104.

Now referring to the graphs 700 in FIG. 7, a brief description of the operation of the resonant gate drive 502 with respect to gate circuit losses is given here. For simplicity only gating signals for one gate are shown in FIG. 7. Let us assume that the sinusoidal voltage 702 (Vg$_{AR1}$) is produced by the resonant gate circuit 502. This voltage 702, when applied at the gate A1, produces a sinusoidal current igAR1 at its output. Since the gate 202A of the first FET switch S1 202 is capacitive, current igA$_{R1}$ 704 is also sinusoidal but has a leading angle of 90° with respect to voltage VgA$_{R1}$ 702. As a result an instantaneous power pgAR1 706, which is sinusoidal at twice the frequency of the gate voltage 702, is drawn from the resonant gate drive circuit 502. The instantaneous power pgA$_{R1}$ 706 has a zero average component (PgA$_{R1}$=0). This means the resonant gate circuit driver 502 results in a loss-less drive. (In actual practice, the average power is not ideally zero but has a small value due to the resistance associated with the components of the resonant gate driver circuit 510. But this average power loss is significantly smaller than the Cg Vg² f losses of the conventional drive circuit 118.)

A resonant gate drive circuit 800 in accordance with the present invention is shown in FIG. 8. This circuit includes a gate driver 508; a series resonant circuit 802 comprising a series inductor 802A having a value Lsg and a series capacitor 802B having a value Csg; and a gate drive transformer 804 (Tg) having a primary winding 806 with Ni turns, a first secondary winding 808, and a second secondary winding 810 each having N2 turns. A parallel resonant circuit 812,814 comprising a parallel inductor 812A,814A having a value Lg and a gate capacitor 812B,814B having a value Cg. The series 802 and parallel 812,814 branches are tuned to a frequency of operation of the gate driver 508. Now let us briefly explain the operation of the circuit 800 of FIG. 8 with the help of waveforms 900 as shown in FIG. 9.

After receiving the signals 116 A1 and A2 from the phase-shift modulator 114 (PSM) on its input 508A, the gate driver 508 generates a square-wave voltage 902 VgA at its output 508B, the square-wave voltage 902 when applied at the series combination of the series resonant circuit 802 and primary winding 806 of the transformer 804 produces a sinusoidal voltage across the primary winding 806 of the transformer 804. Since the parallel branch 812 is tuned to the operating frequency of the driver 508, the application of the sinusoidal voltage across the parallel resonant circuit 812 produces two sinusoidal currents, iCg1 906 through the capacitor 812A and iLg1 908 through the inductor 812B. Both the currents 906,908 have the same magnitude but 180° phase difference. Similarly, the application of the sinusoidal voltage across the parallel resonant circuit 814 produces two sinusoidal currents, iCg2 912 through the capacitor 814B and iLg2 914 through the inductor 814A. Again, both the currents 912,914 have the same magnitude but 180° phase difference. The resultant currents ig1 910 and ig2 916 at the secondary windings 808,810 are, therefore, zero. This means the current drawn from the driver circuit 508 is also zero.

The above description reveals the following two characteristics of the resonant gate driver 502: (1) the average power drawn from the resonant gate drive circuit 502 is zero, and (2) instantaneous current supplied by the gate driver 508 is zero. However, in actual practice, both the average power and current supplied by the driver 508 are not zero but have small values due to resistance associated with components of the resonant gate driver circuit 502. An identical resonant gate drive circuit 800 as shown in FIG. 8 is used for driving gates 204A,206A of the second switch 204 and third switch 206 of the fullbridge inverter 104 with the exception that the signals B1 and B2 are used as the input signals 116 instead of A1 and A2.

FIG. 10 shows another embodiment of the resonant gate driver 1000 in accordance with the present invention in which a common parallel inductor 1002 having a value Lg is connected across the primary winding 806 of the transformer 804 and the inductors 812A,814A across the secondary windings 808,810 are removed.

FIG. 11 shows another embodiment of the resonant gate driver 1100 in accordance with the present invention in which the parallel inductor 1002 of FIG. 10 is an integral part of the transformer 804.

FIG. 12 shows another embodiment of the resonant gate driver 1200 in accordance with the present invention in which both the series 802A and parallel inductor 1002 of FIG. 10 are integral parts of the transformer 804.

Resonant Inverter

A DC/AC inverter in accordance with the invention is shown in FIG. 13A and comprises a full-bridge inverter 104 comprising four switches 202,204,206,208, a commutation inductor 1310A having a value Lc, a blocking capacitor 1310B having a value Cb, a high frequency transformer 214, a series resonant circuit 210 comprising a series inductor 210A having a value Ls and a series capacitor 210B having a value Cs, and a parallel resonant circuit 212 comprising a parallel inductor 212A having a value Lp and a parallel capacitor 212B having a value Cp.

The full-bridge inverter 104 produces a quasi-square voltage at its output terminals. The commutation inductor Lc provides a zero voltage switching condition for the inverter switches in conjunction with the parallel capacitors 1302, 1304,1306,1308 those are connected across the switches. The transformer T is used to match the output voltage level with the input voltage of the full-bridge. The components Ls and Cs of the series resonant circuit and the components Lp and Cp of the parallel resonant circuit are tuned at the operating frequency of the full-bridge inverter. Both the series and resonant circuits provide filtering, for the harmonics contained in the quasi-square wave of the full-bridge inverter, and produce a sinusoidal voltage output across the parallel resonant circuit. Capacitor Cb is used to prevent the saturation of the commutation inductor Lc.

A detailed description of the resonant inverter 1300 of FIG. 13A in conjunction with the operating waveforms 1350 as shown in FIG. 13B is now given. In operation when the resonant gate drive signals $VgA_{R1}$, $VgA_{R2}$, $VgB_{R1}$, $VgB_{R2}$ are applied at the gates of switches 202, 204, 206, 208 respectively, a near quasi-square voltage waveform VAB 1362 is produced at the output 106 of the full-bridge inverter 104. Since both the series 210 and parallel 212 resonant branches are tuned at the operating frequency of the inverter 1300, a near sinusoidal current $i_s$ 1368 through the series branch 210, a near sinusoidal voltage $V_p$ 1366 across the parallel branch 212, and a trapezoidal current $I_{LC}$ 1370 through the commutation inductor 1310A are established. For one cycle of operation of the inverter 1300, the operation of the inverter 1300 is given below.

At time t=t0, only gate voltage $VgB_{R2}$ 1360 at the gate of the second switch 204 is above the gate threshold voltage VGth 1356, which makes the second switch 204 continuously conduct. At the same time the net current iAB (is+ ILC) is negative, which is forcing diode 1322 to conduct.

At t=t1, the gate voltage $VgB_{R2}$ 1360 falls below the threshold voltage VGth, the second switch 204 starts to turn-off and the negative current iAB starts to charge the second capacitor 1304 and discharge the third capacitor 1306. By selecting the proper value of the second capacitor 1304, the rate of rise of voltage across the second switch 204 can be controlled in such a way that the current flowing through the second switch 204 falls to zero before the voltage across the second switch 204 rises substantially. This results in near loss-less turn-off for the second switch 204.

At t=t2, the second capacitor 1304 has charged to the level of input voltage Vi and the third capacitor 1306 has discharged to zero. The negative current iAB (is+ILC) now forces the third diode 1326 to conduct.

At t=t3, the gate voltage $VgA_{R1}$ 1352 rises above the gate threshold voltage VGth 1356, the first switch 202 now starts to conduct. It should be noted that the first switch 202 turns-on under zero voltage as the first diode 1322 across it was conducting prior to the turn-on.

At t=t5, the gate voltage $VgB_{R1}$ 1358 rises above the gate threshold voltage VGth 1356, the third switch 206 now starts to conduct. It should be noted that the third switch 206 turns-on under zero voltage as the third diode 1326 across it was conducting prior to the turn-on.

At t=t6, the gate voltage $VgA_{R1}$ 1352 falls below the threshold voltage VGth 1356, the first switch 202 starts to turn-off and the positive current iAB starts to charge the first capacitor 1302 and discharge the fourth capacitor 1308. By selecting the proper value of the first capacitor 1302, the rate of rise of voltage across the first switch 202 can be controlled in such a way that the current flowing through the first switch 202 falls to zero before the voltage across the first switch 202 rises substantially. This results in near loss-less turn-off for the first switch 202.

At t=t7, the first capacitor 1302 has charged to the level of input voltage Vi and the fourth capacitor 1308 has discharged to zero. The positive current iAB (is+ILC) now forces the fourth diode 1328 to conduct.

At time t=t8, only gate voltage VgB$_{R1}$ 1358 at the gate of the third switch 206 is above the gate threshold voltage VGth, which makes the third switch 206 continuously conduct. At the same time the net current iAB (is+ILC) is positive, which is forcing the fourth diode 1328 to conduct.

At t=t9, the gate voltage VgB$_{R1}$ 1358 falls below the threshold voltage VGth 1356, the third switch 206 starts to turn-off and the positive current iAB starts to charge the third capacitor 1306 and discharge the second capacitor 1304. By selecting the proper value of the third capacitor 1306, the rate of rise of voltage across the third switch 206 can be controlled in such a way that the current flowing through the third switch 206 falls to zero before the voltage across the third switch 206 rises substantially. This results in near loss-less turn-off for the third switch 206.

At t=t10, the third capacitor 1306 has charged to the level of input voltage Vi and the second capacitor 1304 has discharged to zero. The positive current iAB (is+ILC) now forces the second diode 1324 to conduct.

At t=t11, the gate voltage VgA$_{R2}$ 1354 rises above the gate threshold voltage VGth 1356, the fourth switch 208 now starts to conduct. It should be noted that the fourth switch 208 turns-on under zero voltage as the fourth diode 1328 across it was conducting prior to the turn-on.

At t=t12, the gate voltage VgB$_{R2}$ rises above the gate threshold voltage VGth, the second switch 204 now starts to conduct. It should be noted that the second switch 204 turns-on under zero voltage as the second diode 1304 across it was conducting prior to the turn-on.

At t=t13, the gate voltage VgA$_{R2}$ falls below the threshold voltage VGth, the fourth switch 208 starts to turn-off and the negative current iAB starts to charge the fourth capacitor 1308 and discharge the first capacitor 1302. By selecting the proper value of the fourth capacitor 1308, the rate of rise of voltage across the fourth switch 208 can be controlled in such a way that the current flowing through the fourth switch 208 falls to zero before the voltage across the fourth switch 208 rises substantially. This results in near loss-less turn-off for the fourth switch 208.

At t=t14, the fourth capacitor 1308 has charged to the level of input voltage Vi and the capacitor 1302 has discharged to zero. The negative current iAB (is+ILC) now forces the first diode 1322 to conduct.

At t=t15, a new cycle begins and the operation of the inverter 104 as described above repeats.

From the above description, it is clear that the switches of the inverter 104 are turned-on and turned-off with near zero switching losses.

Controlling the phase shift (φ) of the full-bridge inverter 104 controls the high frequency sinusoidal output voltage.

FIG. 14 shows another embodiment 1400 of the resonant inverter 500 OF FIG. 5 in which the parallel resonant circuit 1402 of the resonant circuit 512 is connected across the secondary winding of the transformer 214.

FIG. 15 shows another embodiment of the resonant inverter 500 of FIG. 5 in which both the series 1502 and the parallel resonant 1402 circuits of the resonant circuit 512 are connected across the secondary winding of the transformer 214.

FIG. 16 shows another embodiment of the resonant inverter 500 of FIG. 5 in which the parallel resonant inductor of the resonant circuit 512 is an integral part of the transformer 214.

FIG. 17 shows another embodiment of the resonant inverter 500 of FIG. 5 in which the series resonant inductor of the resonant circuit 512 is an integral part of the transformer 214.

FIG. 18 shows another embodiment of the resonant inverter 500 of FIG. 5 in which both the series and the parallel resonant inductors of the resonant circuit 512 are the integral parts of the transformer 214.

Prototype Inverter System

A prototype of high frequency resonant inverter system of FIG. 15 was built to verify the performance. The inverter system is used to produce a 1 MHz, sinusoidal 28 Vrms, and 240 volt-ampere output power from an input voltage of 400 V DC. The following parameters are used for the power circuit: Cb=1 uF 1310B, Lc=76 uH 1310A, transformer 214 turns ratio (N1/N2=35/3), Ls 1 uH 1502A, Cs=25 nF 1502B, Lp=0.43 uH 1402A, Cp=59 nF 1402B, the switches 1302, 1304,1306,1308 are IRF 840. The following parameters are used for the resonant gate driver 800 of FIG. 8: Lsg=25 uH 802A, Csg=1 nF 802B, turns ratio for the gate transformer 804 (N1/N2=10/10), Lg=18 uH 812A,814A, and Cg=1.3 nF 812B,814B. The output voltage had lower than 1.5% total harmonic distortion, better than 1% voltage regulation and over 96% efficiency including the gate circuit.

The invention therefore provides an AC to DC inverter capable of operating at high frequencies and has very small switching losses.

The embodiment(s) of the invention described above is(are) intended to be exemplary only. The scope of the invention is therefore intended to be limited solely by the scope of the appended claims.

We claim:

1. A direct current (DC) to alternating current (AC) inverter comprising:

a full-bridge inverter for receiving and modifying a DC input voltage, receiving a plurality of first gating signals, and providing a quasi-square wave output;

a first resonant circuit for receiving and modifying the quasi-square wave output from the full-bridge inverter, and providing an AC output voltage at an operating frequency of the inverter;

a phase shift modulation (PSM) circuit for receiving the AC output voltage as feedback and providing a plurality of second gating signals; and a resonant gate driver for receiving and modifying the plurality of second gating signals from the PSM circuit, and providing the plurality of first gating signals.

2. The inverter as claimed in claim 1 wherein the plurality of first gating signals are substantially sinusoidal.

3. The inverter as claimed in claim 1 wherein the plurality of second gating signals are substantially rectangular.

4. The inverter as claimed in claim 1 wherein the resonant gate driver comprises:

a gate drive circuit for receiving and modifying the plurality of first gating signals and providing a plurality of third gating signals; and a second resonant circuit for receiving and modifying the plurality of third gating signals; and providing the plurality of first gating signals.

5. The inverter as claimed in claim 4 wherein the second resonant circuit comprises:

a first parallel resonant circuit, resonant at the operating frequency and having a first capacitor and a first inductor, connected across a first secondary winding of a transformer;

a second parallel resonant circuit, resonant at the operating frequency and having a second capacitor and a second inductor, connected across a second secondary winding of the transformer; and a series resonant circuit, resonant at the operating frequency and having a third inductor and a third capacitor connected in series with a primary winding of the transformer;

whereby the series resonant circuit and primary winding of the transformer receive two of the third gating signals, the first secondary winding provides a first first gating signal, and a second first gating signal; and whereby the first first gating signal is 180° out of phase with the second first gating signal.

6. The inverter as claimed in claim 4 wherein the second resonant circuit comprises:

a first capacitor connected across a first secondary winding of a transformer;

a second capacitor connected across a second secondary winding of the transformer;

a series resonant circuit, resonant at the operating frequency and having a first inductor and a third capacitor, connected in series with a primary winding of the transformer;

a second inductor connected across the primary winding resonant with the first capacitor and second capacitor at the operating frequency; and whereby the series resonant circuit and primary winding of the transformer receive two of the third gating signals, the first secondary winding provides a first first gating signal, and a second first gating signal; and whereby the first first gating signal is 180° out of phase with the second first gating signal.

7. The inverter as claimed in claim 6 wherein the second inductor is integrated with the transformer.

8. The inverter as claimed in claim 7 wherein the first inductor is integrated with the transformer.

9. The inverter as claimed in claim 1 wherein the first resonant circuit comprises:

a transformer having a primary winding and a secondary winding;

a parallel resonant circuit, resonant at the operating frequency and having a first inductor and a first capacitor, connected across the primary winding;

a first series resonant circuit, resonant at the operating frequency and having a second inductor and a second capacitor, connected in series with the primary winding; and a second series resonant circuit, not resonant at the operating frequency and having a third inductor and a third capacitor, connected across the first series resonant circuit and the primary winding;

whereby the quasi-square wave is received from the full-bridge inverter by the second series resonant circuit; and the AC output voltage is provided by the secondary winding.

10. The inverter as claimed in claim 1 wherein the first resonant circuit comprises:

a transformer having a primary winding and a secondary winding;

a parallel resonant circuit, resonant at the operating frequency and having a first inductor and a first capacitor, connected across the secondary winding;

a first series resonant circuit, resonant at the operating frequency and having a second inductor and a second capacitor, connected in series with the primary winding; and a second series resonant circuit, not resonant at the operating frequency and having a third inductor and a third capacitor, connected across the first series resonant circuit and the primary winding;

whereby the quasi-square wave is received from the full-bridge inverter by the second series resonant circuit; and the AC output voltage is provided by the secondary winding.

11. The inverter as claimed in claim 1 wherein the first resonant circuit comprises:

a transformer having a primary winding and a secondary winding;

a first series resonant circuit, resonant at the operating frequency and having a first inductor and a first capacitor, connected in series with the secondary winding;

a parallel resonant circuit, resonant at the operating frequency and having a second inductor and a second capacitor, connected across the primary winding and first series resonant circuit;

a third inductor connected across the primary winding; and a third capacitor connected in series with the primary winding;

whereby the quasi-square wave is received from the full-bridge inverter by the third capacitor and primary winding; and the AC output voltage is provided by the parallel resonant circuit.

12. The inverter as claimed in claim 10 wherein the first inductor is integrated with the transformer.

13. The inverter as claimed in claim 10 wherein the second inductor is integrated with the transformer.

14. The inverter as claimed in claim 10 wherein the first and second inductors are integrated with the transformer.

15. A method of driving an inverter to convert direct current (DC) to alternating current (AC), comprising steps of receiving square wave gating signals at a resonant gate driver and modifying the square wave gating signals to form sinusoidal gating signals for driving the inverter.

* * * * *